July 10, 1951 K. C. EBERLY ET AL 2,560,025
CONVERSION OF LIQUID TO SOLID TETRACHLOROBUTANE
Filed Nov. 22, 1947
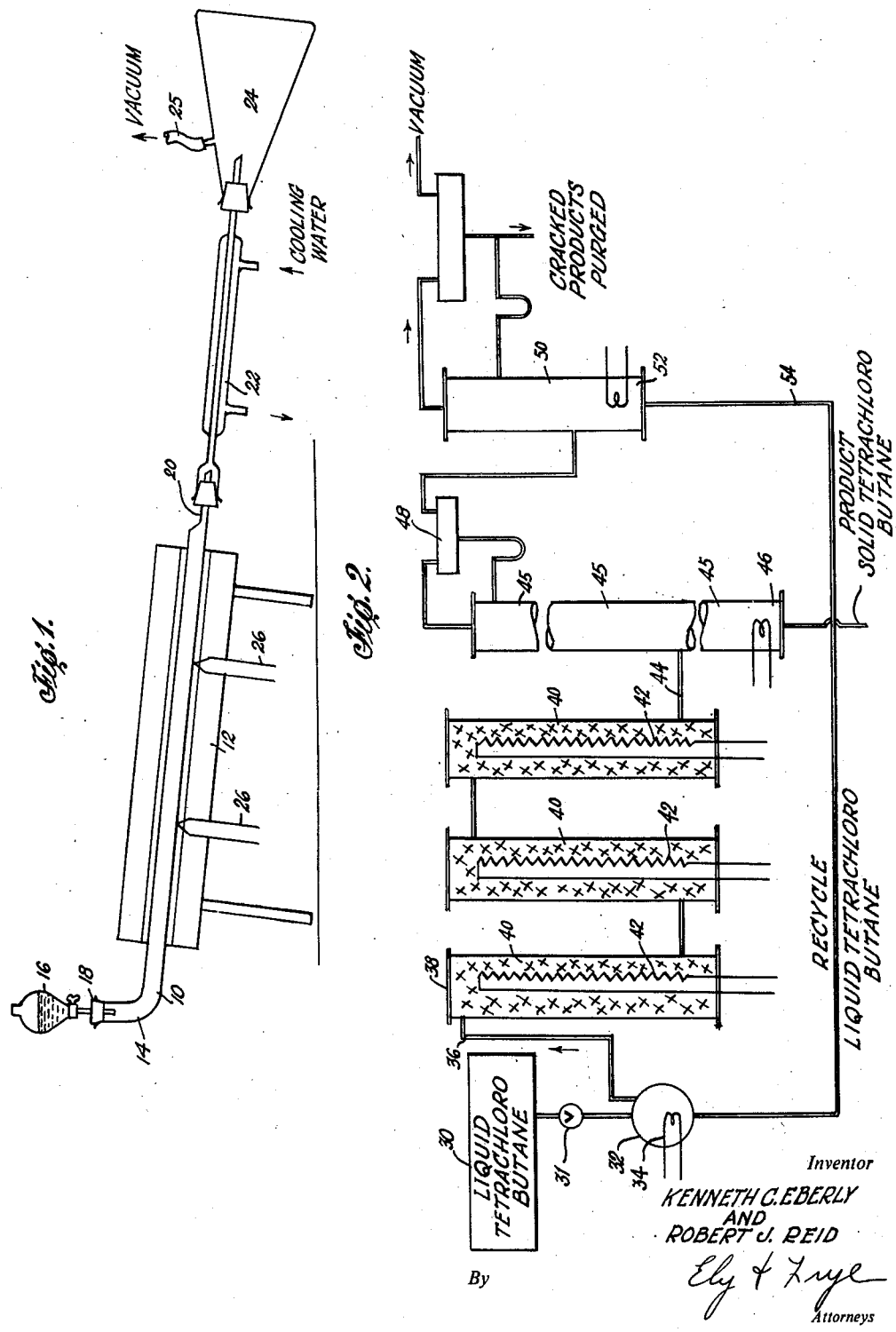
Inventor
KENNETH C. EBERLY
AND
ROBERT J. REID
By Ely & Frye
Attorneys Patented July 10, 1951

2,560,025

UNITED STATES PATENT OFFICE 2,560,025

CONVERSION OF LIQUID TO SOLID TETRACHLOROBUTANE

Kenneth C. Eberly, Akron, and Robert J. Reid, Canal Fulton, Ohio, assignors to The Firestone Tire & Rubber Company, Akron, Ohio, a corporation of Ohio Application November 22, 1947, Serial No. 787,504

6 Claims. (Cl. 260—658)

This invention relates to a process for converting the liquid modification of 1,2,3,4-tetrachlorobutane to the solid modification thereof.

1,2,3,4-tetrachlorobutane (hereinafter designated "tetrachlorobutane") contains two symmetrically disposed asymmetrical carbon atoms (positions 2 and 3) and therefore occurs as a meso-modification and as an unresolved dl-mixture. One of these modifications (hereinafter designated the solid modification) melts at about 72° C., while the other (hereinafter designated the liquid modification) freezes only at very much lower temperatures. The solid modification is the more desirable one, since it may be purified by recrystallization. Further, the solid modification, upon dehydrohalogenation by means of caustic, gives much higher and purer yields of 2,3-dichlorobutadiene than does the liquid modification.

In the synthesis of tetrachlorobutane, for instance by chlorination of butadiene, the production of a certain amount of the liquid modification is unavoidable. By the proper choice of conditions, catalysts etc., the yield of the solid modification may be increased. In practical operation, however, at least 30% of the tetrachlorobutanes obtained will usually consist of the liquid modification, which must be discarded or diverted to the manufacture of relatively less pure products.

Accordingly, it is an object of this invention to convert the liquid modification of tetrachlorobutane to the solid modification.

Another object is to convert the liquid modification to the solid by a process which may be carried out continuously.

A further object is to provide such a process which may be carried out expeditiously and economically in readily and cheaply procurable equipment, with a minimum of skilled supervision.

A still further object is to provide a catalytic process for converting the liquid modification of tetrachlorobutane to the solid modification.

SYNOPSIS OF THE INVENTION

It has been discovered by this invention that the liquid modification of tetrachlorobutane, when subjected in the vapor phase to temperatures in the range 100° C.–525° C., in the presence of a zinc chloride catalyst, becomes partly converted to the solid modification. The reaction appears to be one of equilibrium, slightly favoring the solid modification, and in order to increase the yield of solid modification, the process may be carried out cyclically, the solid modification being separated from the reaction products and the liquid being recycled. The reaction is also more rapid in the higher temperature ranges, in which ranges, however, there come into play competing reactions such as cracking and carbonization, which result in a net loss of materials.

TEMPERATURE OF OPERATION

As noted, the temperature of operation may vary from 100° C. to 525° C. Below this range, the reaction becomes impractically slow, while above this range the loss of materials by way of cracking, polymerization, etc. is excessive. Between these limits, the choice of temperature depends upon an economic balance of speed of reaction and consequent charges for reactor space on the one hand and cost of lost material on the other hand. The upper portion of the temperature range is also somewhat less desirable due to corrosion and fouling of the equipment which sets in at these ranges. In general, the economically most advantageous temperatures lie between 150° C. and 250° C.

THE RATE OF REACTION AND DWELL OF MATERIALS IN THE REACTION ZONE

As noted above, the reaction to which the instant invention relates is reversible, and comes to an equilibrium in which the solid form of tetrachlorobutane predominates to some extent. However, the order of the reaction appears to be such that, after more than about 25% of the liquid modification of tetrachlorobutane has been converted to the solid, further approach to the equilibrium conditions becomes unprofitably slow, particularly if conditions are sufficiently drastic that competing reactions such as carbonization and cracking are appreciable. In general, it will not be advantageous to press the reaction beyond a yield of about 25% of solid in a single treatment of the liquid modification feed stock. This yield corresponds to a minium feed of at least .0002 gram of liquid tetrachlorobutane per cubic centimeter of reaction space per hour. A feed of greater than .01 gram of liquid tetrachlorobutane per cubic centimeter of reaction space per hour will result in a rather low percentage of conversion.

The relatively low conversion obtained on a single pass of the feed stock may be offset, in accordance with this invention, by separating the liquid and solid modifications from the product leaving the reaction zone, and recycling the liquid modification back to the reaction zone. The same result may be obtained by forwarding the unconverted liquid modification to a second conversion treatment zone, again separating the liquid from the solid modification, re-forwarding the unconverted liquid, and so on, limited only by the economic balance between recovery of solid modification and cost of the additional treatments. Another limitaton on recycling and retreatment of the unconverted liquid is the accumulation, in the system, of cracked products, and of impurities introduced with the initial feed. This limitation can be overcome, to a considerable extent, by purging the impurities from the recycled or re-treated liquid material. The separation of the solid modification at each stage may be accomplished by freezing out, or by distillation. In general, recycling and/or forwarding of the liquid modification as above outlined may be carried out profitably to a degree such as to obtain a 60% overall yield of solid modification of tetrachlorobutane. On the basis of 20% conversion in a single reaction stage, this is equivalent to about 4 theoretical stages.

CATALYSIS

As above noted, the conversion of solid to liquid tetrachlorobutane is greatly accelerated by the use of a zinc chloride catalyst, preferably supported upon a porous carrier. If a carrier is used, it will be preferable to deposit the zinc chloride catalyst thereon (as by impregnation with aqueous solution and drying) to the extent of from about 3% to about 40%, based on the total weight of carrier and zinc chloride.

With the foregoing general discussion in mind, the invention will now be described in detail in connection with the attached drawings in which:

Fig. 1 shows an apparatus for demonstrating the variations of which the instant invention is capable, and Fig. 2 shows an arrangement for continuous production with recycling of the unconverted liquid modification.

In the description to follow, all parts given are by weight.

EXAMPLE I

*Variation of conditions and optimum values thereof*

The apparatus employed in this example is shown in Fig. 1 as comprising a 22 mm. (outside diameter) borosilicate glass reaction tube 10 placed in an electric tube furnace 12, the heating zone being 69 cm. long. The charging end 14 is bent upwardly, and a dropping funnel 16 fitted thereinto through a neoprene stopper 18. The discharge end 20 is directed into a condenser 22 and receiver 24. A vacuum connection 25 is provided for maintaining the system under a vacuum. A series of thermocouples 26 is provided for determining and regulating the temperatures at the various points along the tube.

A number of runs was made in this apparatus, using various temperatures, rates of feed, and catalysts in the reaction tube 10. In each case, the temperature of the tube 10 was adjusted to the value selected for that run, and the system evacuated to 100–150 mm. to facilitate vaporization of the material fed. Substantially pure liquid modification of tetrachlorobutane, to the extent of 100 grams, was charged into the dropping funnel 16 and dropped into the tube 10 at the preselected rate, whereby it became vaporized in the tube 10, subjected to the heat prevailing therein, and discharged and condensed in the condenser 22 and receiver 24. When all the material in the dropping funnel 16 had been used up, the product collected at 24 was fractionally distilled. The fraction, if any, coming over below 130° C. at 100 mm. pressure was discarded as consisting of cracked products. The remainder, consisting of solid and liquid tetrachlorobutane, was redistilled through a column at 22 mm. pressure. The fraction coming over at 93.0–94.5° C. was substantially pure liquid tetrachlorobutane, and the residue was substantially pure solid tetrachlorobutane. Set forth herewith in Table I are the particulars of the several runs.

*Table I*

| Catalyst | Reaction Conditions | | | Condition of Catalyst and/or Tube at End of Run | Products (Percent of Material Charged) | | | | | Run No. |
| --- | --- | --- | --- | --- | --- | --- | --- | --- | --- | --- |
| | Temp. (0° C.) | Flow Rate (gm. C$_4$H$_6$Cl$_4$) (c. c. reaction space×hrs.) | | | Total Mat'l Recovered | Losses in Furnace (difference) | Cracked | Solid C$_4$H$_6$Cl$_4$ Recov'd | Liquid C$_4$H$_6$Cl$_4$ Recov'd | |
| None | 221 | .0043 | | clean | 97 | 3 | 1.7 | 1.7 | 94 | 1 |
| | 303 | .001 | | do | 68 | 32 | 0.0 | 5.1 | 60 | 2 |
| | 340 | .0013 | | brown | 99 | 1 | 3.8 | 5.8 | 88 | 3 |
| | 421 | .0013 | | do | 97 | 3 | 7.6 | 11.1 | 79 | 4 |
| | 457 | .0005 | | black | 81 | 19 | 14.2 | 17.3 | 49 | 5 |
| | 523 | .001 | | do | 48 | 52 | 25.9 | 4.1 | 16 | 6 |
| Silica Gel (Note 1) | 230 | .0013 | | clean | 91 | (note 3) 9 | 0.3 | 2.5 | | 7 |
| | 300 | .0011 | | do | 93 | (note 3) 7 | 2.0 | 7.0 | | 8 |
| | 388 | .0013 | | black | 72 | (note 3) 28 | 8.6 | 11.9 | | 9 |
| Silica Gel and 10% ZnCl$_2$ (Note 2) | 90 | .004 | | clean | 82 | (note 3) 18 | 0.0 | 0.0 | 82 | 10 |
| | 194 | .001 | | do | 86 | (note 3) 14 | 0.4 | 10.1 | 74.0 | 11 |
| | 233 | .001 | | do | 85 | (note 3) 15 | .5 | 17.7 | 64.0 | 12 |
| | 281 | .001 | | dark | 80 | (note 3) 20 | 4.0 | 5.4 | 71.4 | 13 |

NOTE 1. 86 grams of 6–20 mesh silica gel packed into heating section of the tube 10.
NOTE 2. 86 grams of 6–20 mesh silica gel impregnated by means of an aqueous solution with 10% by weight of the silica gel of zinc chloride thoroughly dried before use at 225° C. packed as in note 1.
NOTE 3. The loss in these runs is due largely to hold-up in the catalyst mass at the end of the run.

From an inspection of Table I, it will be evident that, although the conversion reaction will take place in the absence of the catalyst of this invention (runs Nos. 1–6) it is necessary to carry out the reaction at much higher temperatures, with consequent extensive cracking of the material (run No. 5) in order to obtain conversions comparable to those secured by the use of catalysts according to this invention (run No. 12). Mere surface catalysis (runs Nos. 7–9) appears to have no effect. Results comparable to those of runs Nos. 11–13 were obtained with pumice, diatomaceous earth, and active clays impregnated with from 5% to 50% of zinc chloride, at pressures ranging from 75 mm. to 3 atmospheres, and over temperature ranges from 100° C. to 450° C.

EXAMPLE II

*Continuous operation recycle of unconverted tetrachlorobutane*

The equipment employed in this example is shown in Fig. 2 as comprising a supply tank 30 containing the liquid tetrachlorobutane to be converted to the solid form, which supply tank feeds through a throttled line 31 into an evaporator 32 containing a heating coil 34 for vaporizing the liquid tetrachlorobutane into the rest of the system. The vaporized tetrachlorobutane passes through a line 36 to a series of three vertical steel reactor tubes 38, 6 inches in diameter and 7 feet tall connected in series. The tubes are packed as indicated at 40 with the silica gel catalyst referred to in note 2 of Table I, and are provided with electric heaters 42. The tubes are maintained at 220° C., 150 mm. pressure, and throughput is at the rate of .001 gram of tetrachlorobutane per c. c. of reaction space per hour—i. e., the conditions of item 12 of Table I are simulated as far as possible. Passage through the tubes 38 effects the conversion of about 15% of the liquid tetrachlorobutane to the solid modification. The tubes 38 discharge vapors of the mixed solid and liquid modification at 44 into the feed section of a reflux tower 45 packed with vertically disposed glass fibers and providing an equivalent of 20 plates above and below feed under the conditions of operation, the reflux ratio being 0.8:1 (reflux: vapors from top of tower), still head temperature being 132° C., still bottom 142° C., pressure at still head being 100 mm. The solid modification is discharged at the reboiler section 46, while the liquid modification passes out through a partial condenser 48 to the feed section of a stripper column 50. The stripper column is operated so as to purge out, as overhead, a quantity of material equal to about 30% of the feed at 31, thus continuously purging the system of cracked products and casual impurities along, of course, with an unavoidable loss of some tetrachlorobutane constituents. The liquid tetrachlorobutane discharged from the reboiler 52 is recycled at 54 to the vaporizer 32. In continuous operation, the above equipment effected between about 50% and about 65% conversion of the liquid tetrachlorobutane supplied at 30 to solid tetrachlorobutane.

Reference is made to the companion application of Eberly Ser. No. 787,505, filed November 22, 1947, drawn to the conversion process generally, independently of the presence or absence of catalysts.

What is claimed is:

1. Process which comprises heating the liquid modification of 1,2,3,4-tetrachlorobutane at temperatures between 100° C. and 525° C., in the presence of a zinc chloride catalyst, whereby to convert a portion of the liquid modification of 1,2,3,4-tetrachlorobutane to the solid modification, and separating the solid modification of 1,2,3,4-tetrachlorobutane from the resultant mixture.

2. Process which comprises heating the liquid modification of 1,2,3,4-tetrachlorobutane at temperatures between 150° C. and 250° C., in the presence of a zinc chloride catalyst, whereby to convert a portion of the liquid modification of 1,2,3,4-tetrachlorobutane to the solid modification, and separating the solid modification of 1,2,3,4-tetrachlorobutane from the resultant mixture.

3. Process which comprises heating the liquid modification of 1,2,3,4-tetrachlorobutane at temperatures between 100° C. and 525° C., in the presence of a zinc chloride catalyst, whereby to convert a portion of the liquid modification of 1,2,3,4-tetrachlorobutane to the solid modification, separating the solid modification of 1,2,3,4-tetrachlorobutane from the resultant mixture, heating the residual liquid modification of 1,2,3,4-tetrachlorobutane at temperatures between 100° C. and 525° C. whereby to convert a further portion of the liquid modification of 1,2,3,4-tetrachlorobutane to the solid modification, and separating the newly formed solid modification of 1,2,3,4-tetrachlorobutane from the still unconverted liquid modification of 1,2,3,4-tetrachlorobutane.

4. Continuous process of converting the liquid modification of 1,2,3,4-tetrachlorobutane to the solid modification, which comprises passing the liquid modification through a reaction zone containing a zinc chloride catalyst maintained at from 100° C. to 525° C., whereby to convert a portion of the liquid modification to the solid modification, separating the solid modification from the resultant mixture, and recycling the residual liquid modification to said reaction zone.

5. Process which comprises heating the liquid modification of 1,2,3,4-tetrachlorobutane at temperatures between 150° C. and 250° C., in the presence of a zinc chloride catalyst, whereby to convert a portion of the liquid modification of 1,2,3,4-tetrachlorobutane to the solid modification, separating the solid modification of 1,2,3,4-tetrachlorobutane from the resultant mixture, heating the residual liquid modification of 1,2,3,4-tetrachlorobutane at temperatures between 150° C. and 250° C., in the presence of a zinc chloride catalyst, whereby to convert a further portion of the liquid modification of 1,2,3,4-tetrachlorobutane to the solid modification, and separating the newly formed solid modification of 1,2,3,4-tetrachlorobutane from the still unconverted liquid modification of 1,2,3,4-tetrachlorobutane.

6. Continuous process of converting the liquid modification of 1,2,3,4-tetrachlorobutane to the solid modification, which comprises passing the liquid modification through a reaction zone containing a zinc chloride catalyst maintained at from 150° C. and 250° C., whereby to convert a portion of the liquid modification to the solid modification, separating the solid modification from the resultant mixture, and recycling the residual liquid modification to said reaction zone.

KENNETH C. EBERLY.
ROBERT J. REID.

REFERENCES CITED

The following references are of record in the file of this patent:

UNITED STATES PATENTS

| Number | Name | Date |
|---|---|---|
| 2,038,593 | Muskat | Apr. 28, 1936 |
| 2,242,084 | Nicodemus | May 13, 1941 |

OTHER REFERENCES

Jacobson: "Jour. Am. Chem. Soc.," vol. 54, pages 1545–8 (1932).

Backer et al.: "Rec. Trav. Chim. des Pays-Bas," vol. 54, pages 52–6 (1935).

Betti et al.: "Atti X° congr. intern. chim.," vol. 2, pages 112–16 (1938).